(12) United States Patent
Smith

(10) Patent No.: US 7,430,756 B2
(45) Date of Patent: Sep. 30, 2008

(54) SYSTEM AND METHOD FOR GENERATING AND AUTHENTICATING A COMPUTER PASSWORD

(75) Inventor: Steven W. Smith, Dallas, TX (US)

(73) Assignee: JSM Technologies, LLC, Richardson, TX (US)

( * ) Notice: Subject to any disclaimer, the term of this patent is extended or adjusted under 35 U.S.C. 154(b) by 722 days.

(21) Appl. No.: 11/020,780

(22) Filed: Dec. 22, 2004

(65) Prior Publication Data

US 2006/0136993 A1    Jun. 22, 2006

(51) Int. Cl.
*G06F 7/04* (2006.01)
(52) U.S. Cl. ............... 726/3; 713/168; 713/169; 713/170; 380/268; 380/255; 726/2; 726/4; 726/5; 726/6; 705/50; 705/51; 705/72
(58) Field of Classification Search ............ 713/168, 713/150, 160, 182, 184; 726/2–6, 26–30; 380/262, 268, 255; 705/50–51, 56, 72
See application file for complete search history.

(56) References Cited

U.S. PATENT DOCUMENTS

| | | | |
|---|---|---|---|
| 4,197,524 A | 4/1980 | Salem | |
| 4,455,588 A | 6/1984 | Mochida et al. | |
| 4,621,334 A | 11/1986 | Garcia | |
| 4,805,222 A | 2/1989 | Young et al. | |
| 5,241,594 A | 8/1993 | Kung | |
| 6,868,499 B1 * | 3/2005 | Buckle | 726/5 |
| 6,954,862 B2 * | 10/2005 | Serpa | 726/5 |
| 7,069,584 B1 * | 6/2006 | Davis | 726/5 |
| 7,197,765 B2 * | 3/2007 | Chan et al. | 726/8 |
| 2001/0054146 A1 * | 12/2001 | Carro et al. | 713/171 |
| 2002/0013794 A1 * | 1/2002 | Carro et al. | 707/534 |
| 2002/0147930 A1 * | 10/2002 | Pritchard et al. | 713/202 |
| 2004/0139313 A1 * | 7/2004 | Buer et al. | 713/150 |
| 2005/0235148 A1 * | 10/2005 | Scheidt et al. | 713/168 |

* cited by examiner

*Primary Examiner*—Kristine Kincaid
*Assistant Examiner*—Canh Le
(74) *Attorney, Agent, or Firm*—Steven W. Smith

(57) ABSTRACT

A system and method for generating and authenticating a password to protect a computer system from unauthorized access. The characters of the password are placed in data packets by an access device. Prior to sending the packets, the device inserts a predefined number of blank packets between each of the character-carrying packets. The number of blank packets is retrieved from a number sequence that is shared between the access device and an authentication device. The authentication device determines whether the received set of password characters matches a stored set of password characters, determines whether the received number of blank packets between the received character-carrying packets matches a predefined number of blank packets, and positively authenticates the access device only if both conditions are met.

20 Claims, 3 Drawing Sheets

SYSTEM AND METHOD FOR GENERATING AND AUTHENTICATING A COMPUTER PASSWORD

BACKGROUND OF THE INVENTION

1. Technical Field of the Invention

The present invention is directed, in general, to computer security systems. More particularly, and not by way of limitation, the present invention is directed to a system and method for generating and authenticating a password to protect a computer system from unauthorized access.

2. Description of Related Art

Computers and networks are often protected by passwords. In order to gain access to the computer or network, a user must enter a password. The computer or network controller (server) authenticates the password by comparing the password entered by the user with a stored password. If the entered password matches the stored password, the user is given access. If not, the user is denied access.

A major problem with password-protected computer systems is the already large and growing threat from "hackers." The popular definition of a hacker refers to individuals who gain unauthorized access to computer systems for the purpose of stealing and/or corrupting data. Hackers are known for breaking into supposedly secure computer systems and damaging web sites, credit card accounts, internal databases, and the like.

Hacker software tools include programs that try many combinations of numbers and letters over a set period of time in an attempt to compromise a password-protected system. On some computer operating systems, as each letter or number is presented by the hacker, the letter or number is confirmed by the system as being correct or incorrect. This serial confirmation sequence actually makes it easier for a hacker to gain entry because fewer combinations of letters and numbers have to be tried. On other operating systems, the password must be completely entered correctly before confirmation is supplied by the system. This may slow down the password discovery process, but with time, the hacker can eventually present a correct password to the target computer system.

Therefore, a need exists in the art for an improved system and method for generating and authenticating a password to protect a computer system from unauthorized access. In particular, there is a need for a system and method that is simple to implement and capable of providing virtually hacker-proof protection for an online computer system. The present invention provides such a system and method.

SUMMARY OF THE INVENTION

In one aspect, the present invention is directed to an apparatus in a network access device for constructing and transmitting a password utilized by an authentication device to authenticate the network access device. The apparatus includes means for receiving from a user, a plurality of predefined characters forming a password; packet forming means for placing each of the received characters in different ones of a plurality of data packets forming a network password; and a memory for storing a plurality of numbers in a predefined number sequence. The numbers in the sequence identify a predefined number of blank packets to be inserted between each character-carrying data packet and an adjacent character-carrying data packet in the network password. The packet forming means retrieves the predefined numbers from the memory and inserts the blank packets between each of the character-carrying data packets in the network password in accordance with the retrieved predefined numbers. The apparatus also includes means for transmitting the network password to the authentication device with each character-carrying data packet being separated from the adjacent character-carrying data packet in the network password by the predefined number of blank packets.

In another aspect, the present invention is directed to a method of authenticating a user device by an authentication device that receives a password sent from the user device. The password comprises a plurality of data packets, wherein the data packets include character packets that transport a set of password characters, and a number of blank packets inserted between each pair of character packets. The method includes the steps of determining by the authentication device, whether the received set of password characters matches a stored set of password characters; determining by the authentication device, whether the received number of blank packets between the received character packets matches a predefined number of blank packets; and positively authenticating the user device only if the received set of password characters matches the stored set of password characters, and the received number of blank packets between the received character packets matches a predefined number of blank packets.

In another aspect, the present invention is directed to a system for protecting a network against unauthorized access. The system includes an apparatus for constructing and transmitting a network password having a plurality of characters, and an authentication device connected to the network for receiving the network password and authenticating the apparatus. The apparatus includes packet forming means for placing each of the password characters in different ones of a plurality of data packets forming the network password, and a memory for storing a plurality of numbers in a predefined number sequence. The numbers identify a predefined number of blank packets to be inserted between each pair of character-carrying data packets in the network password. The packet forming means retrieves the predefined numbers from the memory and inserts the blank packets between each of the character-carrying data packets in the network password in accordance with the retrieved predefined numbers. The apparatus also includes means for transmitting the network password through the network with each pair of character-carrying data packets being separated by the predefined number of blank packets. The authentication device includes means for determining whether the received set of password characters matches a stored set of password characters; means for determining whether the received number of blank packets between the received character packets matches a predefined number of blank packets; and means for positively authenticating the apparatus only if the received set of password characters matches the stored set of password characters, and the received number of blank packets between the received character packets matches a predefined number of blank packets.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is an improved system and method for generating and authenticating a password to protect a computer system from unauthorized access. In the description herein, the computer system is described as a financial authorization network for exemplary purposes only. It should be understood that the invention is applicable to all types of password-protected computer systems.

Figure 1:
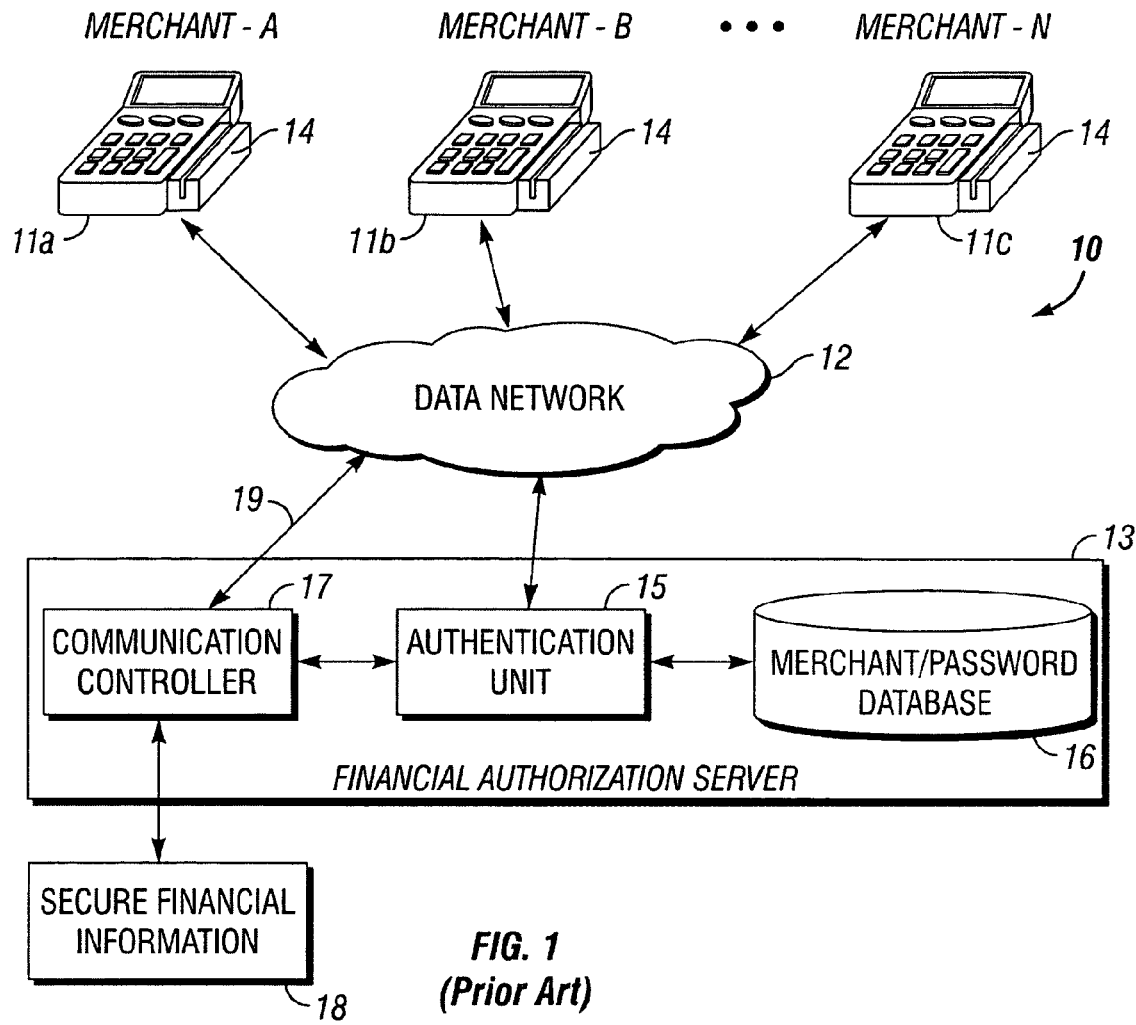
FIG. 1 (Prior Art) is a simplified functional block diagram of an existing financial authorization network.

FIG. 1 is a simplified functional block diagram of an existing financial authorization network 10. A plurality of merchant terminals such as Merchant-A 11a, Merchant-B 11b, and Merchant-N 11n communicate through a data network 12 with a financial authorization server 13. Each merchant terminal includes a magnetic card reader 14 or equivalent device for inputting customer identification and/or credit information. The merchant terminals may be further connected on the merchant side with a point-of-sale (POS) system or intranet (not shown). The data network may be, for example, an Internet Protocol (IP)-based local area network (LAN), wide area network (WAN), or the Internet. The financial authorization server may include an authentication unit 15, a merchant/password database 16, and a communication controller 17.

In operation, each merchant, for example Merchant-A, activates his terminal each morning when the merchant prepares to open for business. The terminal includes a serial number, and the merchant enters an ID number or password assigned to him by the operator of the financial authorization network. Together, the serial number and the ID number/password comprise a terminal password that is transmitted through the data network 12 to the financial authorization server 13. The terminal password is received in the authentication unit 15, which accesses the merchant/password database 16 and compares the received terminal password with a stored password. If the passwords match, the authentication unit approves Merchant-A's terminal for financial transactions and sends an approval indication to the terminal 11a. Thereafter, when a customer's credit card is read by the magnetic card reader 14, the card number together with the terminal serial number are sent to the financial authorization server. The authentication unit 15 recognizes the serial number as being approved and sends the credit card information to the communication controller 17. The communication controller then accesses secure financial information 18 to determine whether the credit card number is approved for the transaction. The controller then returns either a positive or negative indication 19 to the Merchant-A terminal.

In some networks, the merchant terminal may send its terminal password along with each credit card transaction. When the authentication unit 15 positively authenticates the password, the credit card information is passed to the communication controller 17 for access to the secure financial information 18.

Figure 2:
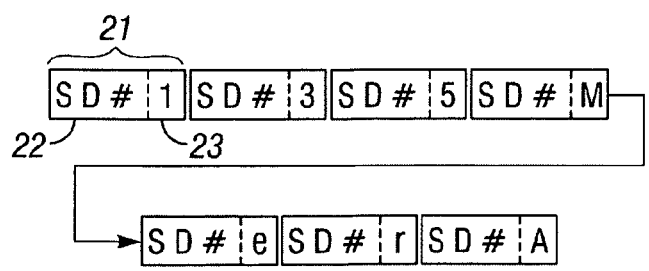
FIG. 2 (Prior Art) is a simplified illustrative drawing of an existing password data structure.

FIG. 2 is a simplified illustrative drawing of an existing terminal password data structure. In the example of Merchant-A, the terminal serial number may be, for example "135", and the merchant's ID or password may be "merA". Together, the terminal password becomes "135merA". In an IP-based network, each character in the password is transmitted in a packet 21. Each packet includes a header portion 22 and a payload portion 23. The header portion includes a source IP address (S), a destination IP address (D), and a packet number (#) indicating the order in which the packets were transmitted. The payload portion carries the data being transported by the packet. In this instance, the payload portion of each packet carries one of the characters of the terminal password. Packets with long payload portions may also have an end-of-packet indicator.

Each packet is routed from the Merchant-A terminal 11a through a number of routers in the data network 12, and finally to the authentication unit 15 in the financial authorization server 13. When the authentication unit receives the packets, the packets may arrive in the order in which they were transmitted, or they may arrive out of order. The authentication unit uses the packet number in each header to place the packets in proper order, and then strips off the headers to compare the payload characters with the password information stored in the merchant/password database 16.

A major problem with this existing approach for password authorization is that any hacker who obtains the terminal password can gain access to the financial authorization network, and can run bogus credit card transactions. The present invention solves this problem with a password structure and methodology that differs in several key aspects.

Figure 3:
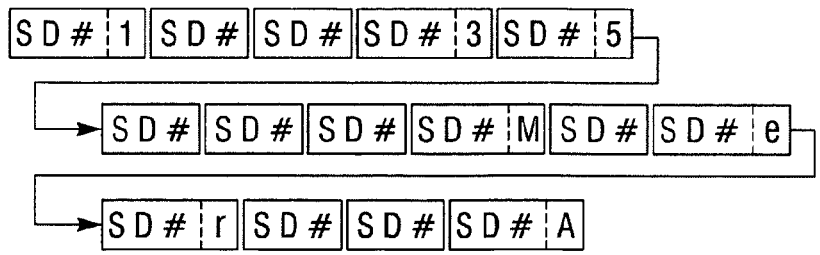
FIG. 3 is a simplified illustrative drawing of an exemplary embodiment of the inventive password data structure.

FIG. 3 is a simplified illustrative drawing of an exemplary embodiment of a data structure of the network password of the present invention. When a computer terminal requests access, the terminal constructs the network password by interleaving a variable number of "empty" or "blank" packets between each character-carrying packet in the password. An empty packet is basically the header portion of the packet without any payload. In the description herein, the term "blank packet" is intended to mean both empty packets and packets with predefined data bits that are recognized by the authentication device as being "filler" and not a password character. The number of blank packets may be different between each pair of character-carrying packets in the password. In some places in the password there may be none, while in other places there may be a large number of blank packets. The addition of blank packets to the password does not significantly increase the traffic load on the network since the added packets carry no payload.

The accessing terminal and the financial authorization server share a blank packet number sequence that specifies how many blank packets there should be between each pair of character-carrying packets in the password. A valid network password must have not only the correct characters of the password, but also the correct number of blank packets between each pair of character-carrying packets. Thus, any hacker who illegally obtains the terminal password and transmits the terminal password in the traditional manner (i.e., without blank packets) will be rejected, and will not gain access to the network.

The blank-packet count may be disseminated from the server to the individual merchant terminals in a number of different ways, and more or less frequently, depending on the degree of security required. For example, at the beginning of a predefined time period such as a month, week, day, or hour, the server may send a set of numbers to a terminal. Each number in the set represents the number of blank packets that the terminal should insert between each sequential pair of character-carrying packets in the password. Thus, in the network password illustrated in FIG. 3, the set of numbers would be 2,0,3,1,1,2. This set may be part of a much longer sequence of numbers. For highly secure transactions, the terminal may be programmed to change the set of numbers for each transaction by, for example, using the next set of numbers in the longer sequence following the set that was used in the previous transaction. Thus, the number of blank packets between each pair of characters may change for each transaction. In this situation, of course, the server is also programmed to step to the next set of numbers when authenticating the terminal. Thus, even if a hacker intercepts a password attempt and reads the number of blank packets between each of the characters, that same combination of characters and blank packets will be rejected on the next access attempt if the hacker tries to use it.

If the terminal and server ever get out of synch, as evidenced by several failed access attempts, a synchronization process is begun, which may cause the terminal and server to both go to a synchronization point in the sequence and try again. The synchronization point may be a predefined point in the number sequence, or the server may instruct the terminal to go to a particular point in the sequence.

The blank packet number sequence may be disseminated over the existing network connections, but in some cases, this could compromise the sequence to hackers who may be "snooping". Therefore, when security is of greater importance, the sequence may be encrypted and disseminated by a secure communication link, or may be delivered to the terminal by a trusted courier on a physical medium such as a diskette or CD.

It should also be noted that when using a communication protocol such as the Transmission Control Protocol (TCP), the receiving entity utilizes the packet numbers in the packet headers to reorder the packets in the correct sequence and also to determine whether any packets were delayed or lost in the transmission. If a packet is lost, the receiving entity requests the transmitting entity to retransmit the lost packet. Therefore, even with network conditions that cause packet delay and packet loss, the server will request the terminal to retransmit any packets that are not received. Thus, access attempts are not rejected due to network conditions that cause individual packets to be delayed or lost.

It should also be noted that with the present invention, the retransmission of lost packets may not be required in all cases. For example, if all of the characters of the password are received, lost blank packets do not have to be retransmitted. Instead, the server merely calculates the number of blank packets that were transmitted by subtracting the packet number of each character packet from the packet number of the subsequent character packet. If this result matches the blank-packet count in the current set for that position in the password, the password is verified and access is granted without retransmitting any packets.

Figure 4:
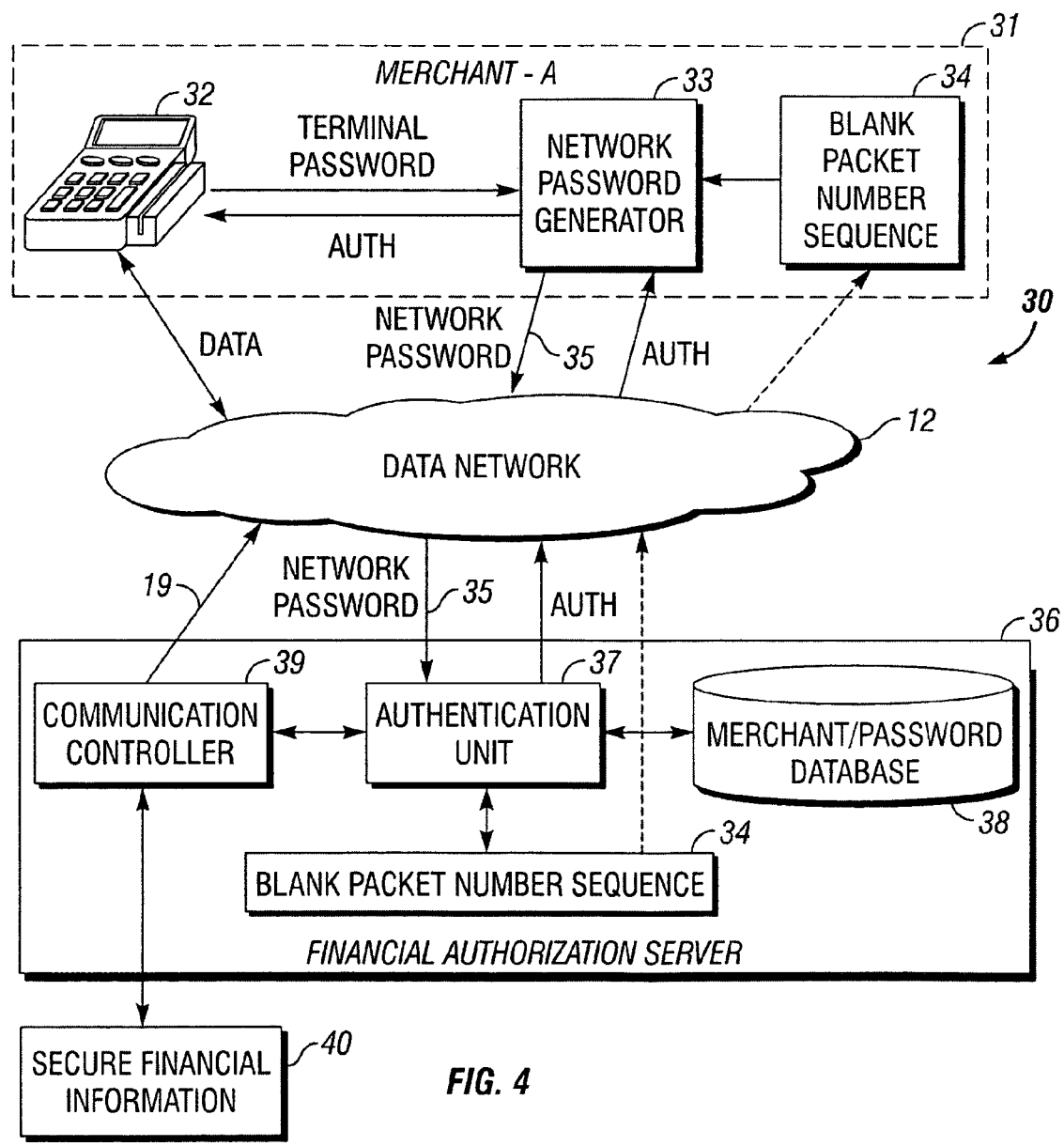
FIG. 4 is a simplified functional block diagram of an exemplary financial authorization network modified in accordance with the teachings of the present invention.

FIG. 4 is a simplified functional block diagram of an exemplary financial authorization network modified in accordance with the teachings of the present invention. The merchant terminal environment 31 is modified to include a terminal 32 and a network password generator 33. The network password generator may be implemented internally in the merchant terminal or in a separate unit that interfaces with the merchant terminal. The terminal sends its standard terminal password (e.g., serial number and merchant ID) to the network password generator. The blank-packet number sequence 34 is also input to the network password generator, which generates a network password 35 by inserting the appropriate number of blank packets between the packets of the terminal password, as specified by the blank-packet number sequence. As noted above, the blank-packet number sequence may be input via a standard network connection from the financial authorization server, via a secure encrypted connection, or via a physical medium such as a CD delivered to the merchant.

The network password generator 33 then sends the network password 35 through the data network 12 to the server 36. An authentication unit 37 receives the network password and compares the characters received with a stored password in a merchant/password database 38. The authentication unit also compares the number of blank packets between the received characters with the current number set from the blank-packet number sequence 34, which is shared between the terminal and the server. The authentication unit positively authenticates the network password only if the received characters match the stored characters, and the number of received blank packets between the received character-carrying packets matches the number specified by the blank-packet number sequence.

If the network password 35 is accompanied by a credit card number from a credit card transaction, and the authentication unit network positively authenticates the password, the credit card information is passed to a communication controller 39 for access to secure financial information 40.

Figure 5:
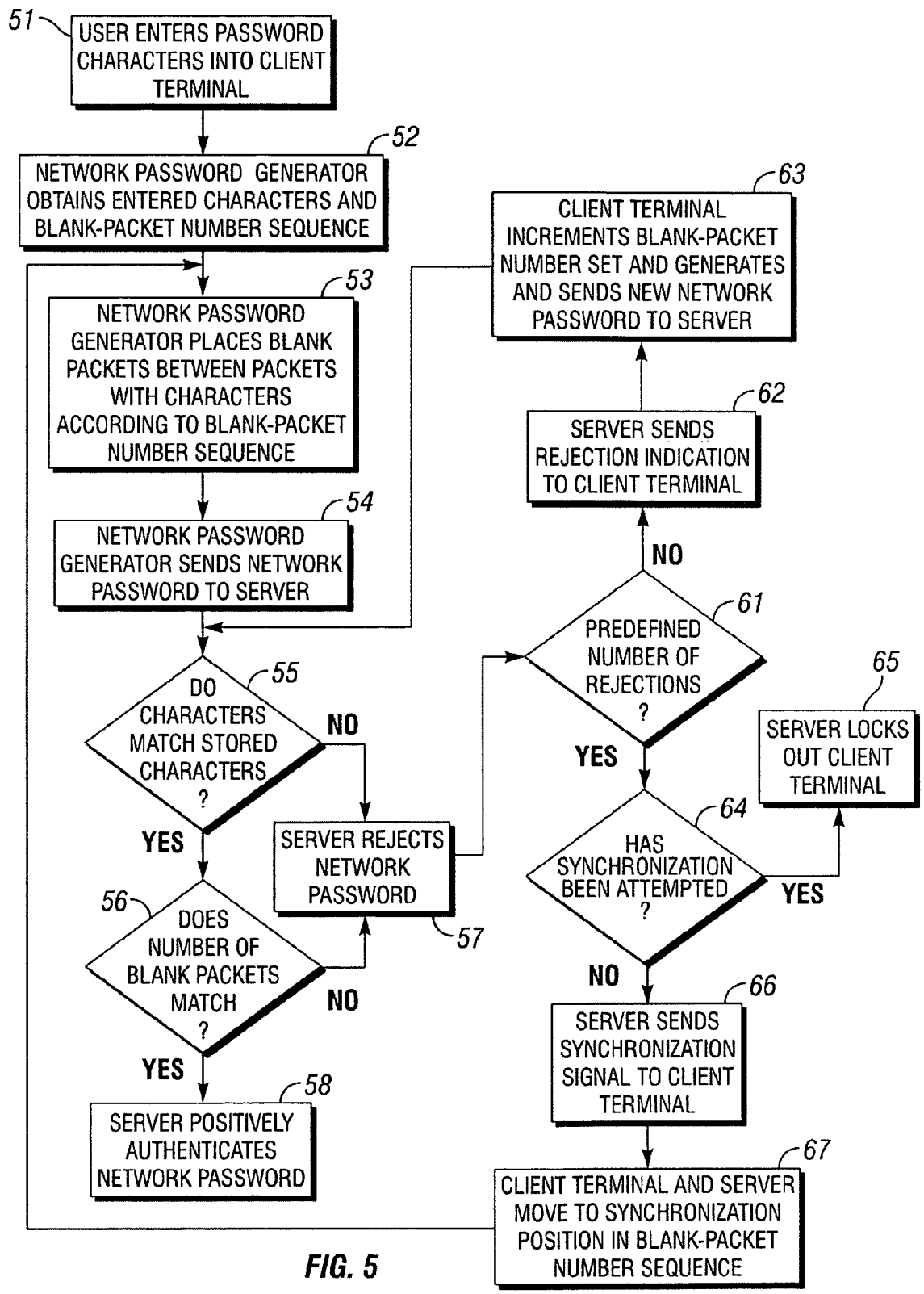
FIG. 5 is a flow chart illustrating the steps of an exemplary embodiment of a method of generating and authenticating a password according to the teachings of the present invention.

FIG. 5 is a flow chart illustrating the steps of an exemplary embodiment of a method of generating and authenticating a password according to the teachings of the present invention. Starting at step 51, a user enters the characters of a password into a client terminal. At step 52, a network password generator associated with the client terminal obtains the entered password characters from the client terminal and obtains a blank-packet number sequence that is shared with an authentication server. At step 53, the network password generator places the characters in packets and places blank packets between the character-carrying packets in accordance with the blank-packet number sequence. At step 54, the network password generator sends the network password to the server.

At step 55, an authentication unit associated with the server determines whether or not the characters received in the network password match the characters of a stored password associated with the client terminal. If not, the process moves to step 57 where the server rejects the network password. However, if the characters match at step 55, the process moves to step 56 where the authentication unit determines whether or not the number of blank packets between each pair of character-carrying packets matches the number of packets specified by the blank-packet number sequence. If the number of blank packets matches at step 56, the process moves to step 58 where the server positively authenticates the network password. However, if the number of blank packets does not match, the process moves to step 57 where the server rejects the network password.

At step 61, the server determines whether this client terminal has experienced a predefined number of password rejections. If not, the process moves to step 62 where the server sends a rejection indication to the client terminal. At step 63, the client terminal increments the blank-packet number set and generates and sends a new network password to the server. The process then returns to step 55 and repeats the authentication process for the new password.

If it is determined at step 61 that the client terminal has experienced the predefined number of password rejections, the process moves to step 64. Since multiple password rejections may be caused by the client terminal and server being out of synch regarding the correct position in the blank-packet number sequence, the process determines at step 64 whether or not synchronization has already been attempted. If so, the process moves to step 65 where the server locks out the client terminal. However, if synchronization has not yet been attempted, the process moves to step 66 where the server sends a synchronization signal to the client terminal specifying a synchronization position in the blank-packet number sequence, or alternatively, instructing the client terminal to go to a predefined synchronization position. At step 67, both the client terminal and the server move to the synchronization position in the blank-packet number sequence. The process then returns to step 53 where the network password generator generates a new password using the characters entered by the user and inserting blank packets between the character-carrying packets in accordance with the synchronization position in the blank-packet number sequence. The process then continues with the authentication procedure. If the client terminal is an authorized terminal that was temporarily out of synch with the server, the synchronization process should correct the problem, and the password should be positively authenticated. If the client terminal is a hacker, who does not know to insert blank packets or does not have access to the blank-packet number sequence, the synchronization process will not correct the problem, and the hacker will be denied access.

A benefit of the present invention is that it is transparent to the user. That is, the user always uses the same terminal (with the same serial number) and the same password or ID for every transaction. The terminal changes the network password as often as the network operator desires by changing the number of inserted blank packets in the manner and at the frequency defined by the network operator. The user does not have to remember multiple passwords or change his password on a periodic basis. Even if a hacker knows the user's password, the hacker cannot gain access. Since any number of blank packets can be inserted between any two characters in the password, the combination of characters and blank packets is practically limitless. Also, the system may change the number of blank packets between each pair of password characters for each transaction. Therefore, even if a hacker intercepts a transmission and determines the blank-packet count between each pair of character-carrying packets, the count may change in the next transmission, denying the hacker access to the network.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. In a network access device, an apparatus for constructing and transmitting a password utilized by an authentication device to authenticate the network access device, said apparatus comprising:
    means for receiving from a user, a plurality of predefined characters forming a password;
    packet forming means for placing each of the received characters in different ones of a plurality of data packets forming a network password;
    a memory for storing a plurality of numbers in a predefined number sequence, said numbers identifying a predefined number of blank packets to be inserted between each character-carrying data packet and an adjacent character-carrying data packet in the network password, wherein the packet forming means retrieves the predefined numbers from the memory and inserts the blank packets between each of the character-carrying data packets in the network password in accordance with the retrieved predefined numbers; and
    means for transmitting the network password to the authentication device with each character-carrying data packet being separated from the adjacent character-carrying data packet in the network password by the predefined number of blank packets.

2. The apparatus of claim 1, wherein the password includes at least three character-carrying data packets, and wherein the predefined number sequence specifies a first predefined number of blank packets between a first pair of character-carrying data packets and a different second predefined number of blank packets between a second pair of character-carrying data packets.

3. The apparatus of claim 1, wherein the blank packets are either empty packets or carry only non-character filler data.

4. A method of authenticating a user device, said method comprising the steps of:
    receiving by an authentication device, a password sent from the user device, said password comprising a plurality of data packets, wherein the data packets include character packets that transport a set of password characters, and a number of blank packets inserted between each pair of character packets;
    determining by the authentication device, whether the received set of password characters matches a stored set of password characters;
    determining by the authentication device, whether the received number of blank packets between the received character packets matches a predefined number of blank packets; and
    positively authenticating the user device only if the received set of password characters matches the stored set of password characters, and the received number of blank packets between the received character packets matches a predefined number of blank packets.

5. The method of claim 4, wherein the number of blank packets inserted between a first pair of character packets is different than the number of blank packets inserted between a second pair of characters.

6. The method of claim 4, wherein the step of determining whether the received number of blank packets between the received character packets matches a predefined number of blank packets includes:
    accessing a database that stores a sequence of numbers, each number in the sequence being associated with a corresponding position between two characters in the password; and
    determining whether the received number of blank packets between each pair of received character packets matches the associated number in the number sequence.

7. The method of claim 4, further comprising, prior to receiving the password from the user device, the step of sending from the authentication device to the user device, information regarding the number of blank packets to be inserted between each pair of character packets.

8. The method of claim 7, wherein the authentication device periodically sends a new number of blank packets to the user device.

9. The method of claim 4, wherein the step of receiving the password includes receiving blank packets that are either empty packets or carry only non-character filler data.

10. The method of claim 4, wherein the user device includes means for inputting customer credit information, and the authentication device is connected to a server in a financial authorization network.

11. The method of claim 4, wherein each of the character packets and blank packets includes a header having a sequential packet number therein, and the step of positively authenticating the user device includes:
    determining from the packet numbers that at least one of the blank packets was lost, said lost blank packet being between a first character packet and a later, second character packet;

calculating the actual number of blank packets that were transmitted by the user device by subtracting the packet number of the first character packet from the packet number of the later, second character packet; and determining that the calculated actual number of transmitted blank packets matches the predefined number of blank packets.

12. A system for protecting a network against unauthorized access, said system comprising:

an apparatus for constructing and transmitting a network password having a plurality of characters, said apparatus including:

packet forming means for placing each of the characters in different ones of a plurality of data packets forming the network password;

a memory for storing a plurality of numbers in a predefined number sequence, said numbers identifying a predefined number of blank packets to be inserted between each pair of character-carrying data packets in the network password, wherein the packet forming means retrieves the predefined numbers from the memory and inserts the blank packets between each of the character-carrying data packets in the network password in accordance with the retrieved predefined numbers; and means for transmitting the network password through the network with each pair of character-carrying data packets being separated by the predefined number of blank packets; and an authentication device connected to the network for receiving the network password and authenticating the apparatus, said authentication device comprising:

means for determining whether the received set of password characters matches a stored set of password characters;

means for determining whether the received number of blank packets between the received character packets matches a predefined number of blank packets; and means for positively authenticating the apparatus only if the received set of password characters matches the stored set of password characters, and the received number of blank packets between the received character packets matches a predefined number of blank packets.

13. The system of claim 12, wherein the packet forming means inserts a different number of blank packets between a first pair of character packets and a second pair of characters.

14. The system of claim 12, wherein the means for determining whether the received number of blank packets between the received character packets matches a predefined number of blank packets includes:

a database that stores a predefined sequence of numbers, each number in the sequence being associated with a corresponding position between two characters in the password;

means for retrieving the predefined number sequence; and means for comparing the received number of blank packets with the predefined number sequence to determine whether the received number of blank packets between each pair of received character packets matches the associated number in the number sequence.

15. The system of claim 12, further comprising means within the authentication device for sending to the apparatus, information regarding the number of blank packets to be inserted between each pair of character packets.

16. The system of claim 15, wherein the means within the authentication device for sending information regarding the number of blank packets to the apparatus includes means for encrypting the information and sending the encrypted information to the apparatus through the network.

17. The system of claim 15, wherein the authentication device periodically sends a new number of blank packets to the apparatus.

18. The system of claim 12, wherein the apparatus includes a magnetic card reader, and the authentication device is a server in a financial authorization network.

19. The system of claim 12, wherein the apparatus includes means for inputting customer credit information, and the authentication device is connected to a server in a financial authorization network.

20. The system of claim 12, wherein each of the character packets and blank packets includes a header having a sequential packet number therein, and the means for positively authenticating the apparatus includes:

packet counting means for determining from the packet numbers that at least one of the blank packets was lost, said lost blank packet being between a first character packet and a later, second character packet;

means for calculating the actual number of blank packets that were transmitted by the user device by subtracting the packet number of the first character packet from the packet number of the later, second character packet; and means for determining that the calculated actual number of transmitted blank packets matches the predefined number of blank packets.

* * * * *